(No Model.)
J. E. CROOK.
AXLE LUBRICATOR.
No. 469,966. Patented Mar. 1, 1892.
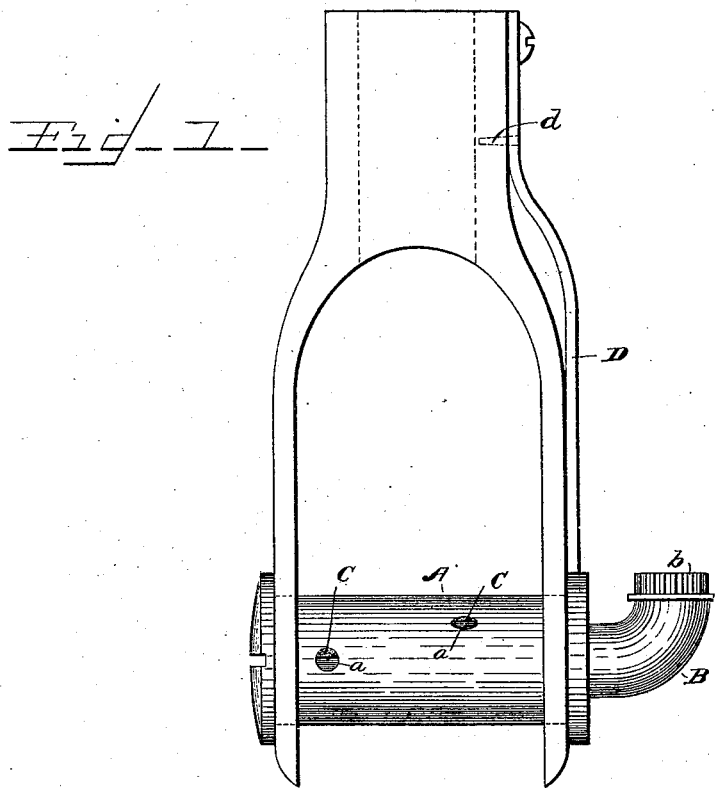
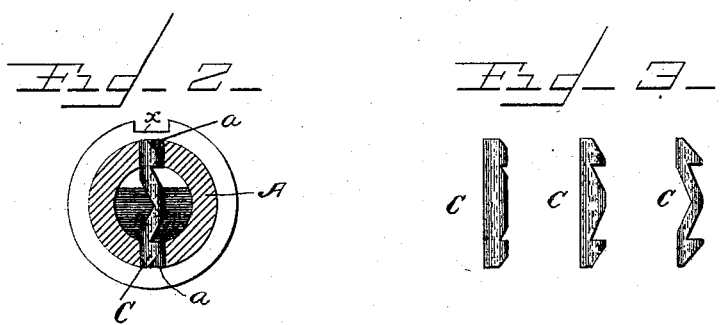
Witnesses:
Aly Scott
Dawd H Mead.
Inventor:
James E. Crook.
By A. M. Smith & Son
Associate Attorneys.

UNITED STATES PATENT OFFICE.

JAMES E. CROOK, OF LINCOLN, NEBRASKA, ASSIGNOR OF ONE-HALF TO SOPHIA W. DAVIS, OF SAME PLACE.

AXLE-LUBRICATOR.

SPECIFICATION forming part of Letters Patent No. 469,966, dated March 1, 1892.

Application filed July 22, 1891. Serial No. 400,374. (No model.)

*To all whom it may concern:*

Be it known that I, JAMES E. CROOK, a citizen of the United States, residing at Lincoln, in the county of Lancaster and State of Nebraska, have invented a new and useful Improvement in Axle-Lubricators, of which the following is a specification.

My invention relates to an improvement in lubricators, or, more particularly, to the construction of the axles of pulleys, wheels, &c., whereby a constant supply of oil is furnished automatically while the pulley or wheel is in motion.

My invention consists in the combination, with a hollow axle provided with perforations or apertures leading from its interior to its exterior surface, of pieces of reed fitting snugly in said perforations and so notched or shaped that they will receive and conduct the oil or lubricant from the interior of said axle to the exterior surface at suitable points, as hereinafter described and claimed.

In the accompanying drawings, Figure 1 represents in side elevation an axle with my improvements applied. Fig. 2 is a vertical transverse section through the axle, and Fig. 3 shows different forms of my improved reed transmitter.

A represents an axle, which may be of any form, either for ordinary pulley-wheels or buggy or wagon wheels. The axle illustrated in the drawings is adapted for use in trolley-wheels and will be described with reference to the same. Said axle is made in the form of a hollow cylinder and is provided with perforations or apertures $a\ a$. One end of said axle is provided with a supply-pipe B, into which the oil is poured, and through which it passes to the interior of the axle A, being prevented from escaping by means of a cap $b$ screwing into the end of the pipe B.

C represents the oil-transmitter, which I form from a piece of ordinary reed or other like endogenous material, the nature of which is too well understood to need description. These pieces of reed lie in the perforations or apertures in the hollow axle A, and are notched or cut out at points intermediate their ends, preferably in the manner illustrated in Fig. 3, for the purpose of more readily admitting the oil or other lubricant to the interstices or fine perforations in the reed, whence the said oil is conducted by gravity or the motion of the wheel or axle to the exterior surface of said axle where it is needed. The oil confined in the axle will be thus steadily drawn from the interior of said axle through the perforations in the reeds C in the apertures $a\ a$, and thus the wheel and exterior surface of the axle will be kept constantly oiled.

Any ordinary device may be made use of preventing the revolution of the axle A when the wheel in connection wherewith it is used is in motion. In Fig. 1 is shown the spring D, which I make use of for said purpose. One end of the spring D is secured to a convenient point on one of the arms or forks of the trolley-frame, the other end of the spring engaging an incision or recess $x$ in the end of the axle A, whereby said axle is prevented from turning, as will be readily understood. The pin $d$ on the spring D enters a perforation in the trolley-wheel frame and prevents movement of said spring.

I claim—

1. The combination, with a hollow axle provided with apertures leading from its interior to its exterior surface, of a foraminated reed supported, as to its ends, in oppositely-located apertures, and formed with notches or incisions intermediate its ends, for the purpose specified.

2. A hollow axle provided with perforations or apertures leading from the interior to the exterior thereof and having a supply pipe or nozzle and cap, of a reed transmitter extending transversely through said axle, with its ends lying in oppositely-disposed apertures and formed with notches or incisions for admitting the oil or lubricant to the pores of said reed transmitter, all substantially as described.

3. The combination of the axle A, provided with perforations $a$, supply-pipe B, with cap $b$, reed transmitter C, and spring D, all substantially as described.

In witness whereof I have hereunto set my hand in the presence of two witnesses.

JAMES E. CROOK.

Witnesses:
JOSEPH WÜRZBURG,
W. J. JONES.